April 26, 1966  W. H. KÖHLER  3,248,268
BATTERY CONSTRUCTION
Filed June 25, 1963

INVENTOR.
WERNER H. KÖHLER
BY *Dicke + Craig,*
ATTORNEYS.

3,248,268
                                                      Patented Apr. 26, 1966

1

3,248,268
BATTERY CONSTRUCTION
Werner H. Köhler, Stuttgart-Degerloch, Germany, assignor to Daimler-Benz Aktiengesellschaft, Stuttgart-Unterturkheim, Germany
Filed June 25, 1963, Ser. No. 290,534
Claims priority, application Germany, June 28, 1962,
D 39,241
10 Claims. (Cl. 136—171)

The present invention relates to electric batteries, and more particularly to improve securing means for electric batteries in motor vehicles.

It is already known in the prior art to provide motor vehicle batteries, especially those with relatively thin housing walls, at two mutually opposite sides externally thereof with vertical ledges or terminal moldings projecting outwardly from the housing walls and of dovetail-shaped cross section and to cause engagement of these ledge cross sections by the hook-shaped cross sections of two securing ledges which are threadably connected with one another and engage with the hook portions thereof from behind the dovetail cross sections. The threadably connected securing ledges are secured, in turn, by means of a rectangularly bent bed-plate on a battery side-rest, for example, are threadably secured thereat. The threaded parts of such prior art construction, however, form structurally complicated securing means of which the mounting and fastening is relatively time-consuming and troublesome, especially by reason of the limited spatial conditions of engine spaces in motor vehicles. A further disadvantage of the aforementioned prior art manner of assembly and attachment resides in the fact that the securing places of the battery ledges at the side-rest and the engagement of the securing ledges at the form ledges of the battery have to be matched very accurately to one another.

These disadvantages are eliminated by the present invention. The present invention essentially consists in providing at two mutually oppositely disposed places or sides of the battery vertical reinforcing ledges or terminal moldings having any desired fully closed cross section or also having a channel-shaped cross section open toward the outside to permit insertion therethrough of the battery securing bolts, and by providing the cross sections of these vertical ledges or terminal moldings with a liner member made of a material particularly resistant to compression for absorbing the clamping pressure of the threaded connection of the battery. The liner member consists of a tubular member extending longitudinally through the reinforcing ledges or moldings and made of an acid-resistant material, especially of metal, or consists of an outwardly open U-shaped profiled cross section, preferably of such a profiled cross section that the leg portions thereof are mutually inclined toward each other to such an extent that the battery securing bolts can possibly also be inserted from the outside transversely through the U-shaped channel and still a certain play remains for the securing bolts so that the exact battery position may be corrected immediately prior to the secure tightening of the battery.

Accordingly, it is an object of the present invention to provide an electrical battery for motor vehicles and more particularly a securing arrangement for such batteries which is simple in construction, easy to assemble and disassemble, yet eliminates effectively and reliably the shortcomings encountered with the prior art constructions.

It is another object of the present invention to provide an electric battery for motor vehicles which may be readily installed and secured within the engine space without the use of complicated structural parts.

Still a further object of the present invention resides in the provision of an electrical battery for motor vehicles which permits installation and secure clamping thereof without requiring an accurate fitting of the securing parts.

A further object of the present invention resides in the provision of an electric battery which may be readily installed within the vehicle, and more particularly within the engine space without requiring a large amount of space for the installation thereof.

Still another object of the present invention resides in the provision of an electric battery for motor vehicles which may be adjusted in its position by the existence of a certain play immediately prior to being tightly secured in the desired position.

These and further objects, features and advantages of the present invention will become more obvious from the following description when taken in connection with the accompanying drawing which shows, for purposes of illustration only, two embodiments in accordance with the present invention and wherein.

Figure 1:
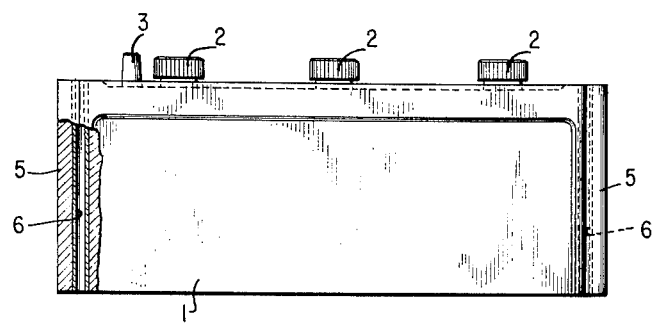
FIGURE 1 is a side elevational view, partly in cross section, of a motor vehicle battery in accordance with the present invention.
Figure 2:
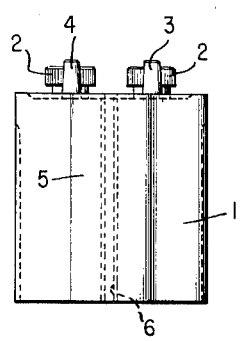
FIGURE 2 is an end elevational view of the battery of FIGURE 1.
Figure 3:
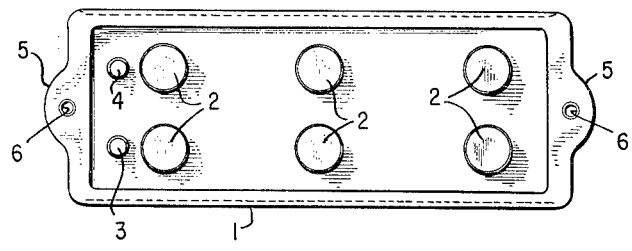
FIGURE 3 is a top plan view of the battery shown in FIGURE 1.
Figure 4:
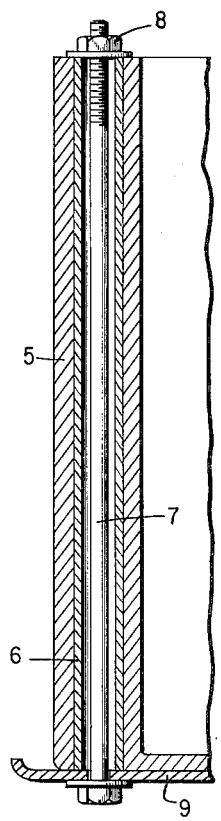
FIGURE 4 is a longitudinal cross-sectional view, on an enlarged scale, of the battery-securing arrangement utilized with the battery of FIGURES 1 to 3.

Referring now to the drawing wherein like reference numerals are used throughout the various views to designate like parts and more particularly to FIGURES 1, 2, and 3, the battery according to the present invention consists of the usual rectangular housing 1 containing the electrical cells, while reference numeral 2 designates the closure plugs for the filling holes and reference numerals 3 and 4 the terminals for the cable connections of the battery.

According to the present invention there is provided at each battery end-wall one outwardly projecting, ledge-like reinforcement bulge or molding 5 which encloses an acid-resistant tubular member 6 extending longitudinally therethrough. The tubular member 6 is inserted either already during manufacture of the battery housing or only subsequently thereto; and more particularly, the tubular member 6 is inserted into the ledge portion 5 either with corresponding small tolerance, is vulcanized in its proper position or is bonded or cemented in its proper position within the ledge portion 5. The battery securing bolts 7 are inserted through the tubular members 6, preferably from below, and the battery is clamped tight on the side-rest 9 by means of nuts 8. The clamping pressure is absorbed by the tubular member 6 without thereby subjecting the battery housing 1 itself to any loads.

The tube may also have an oval or prismatic cross section. In general, the cross section for the bolt member should have so much play within the tubular member 6 that the battery may still be displaced by a small amount in all directions immediately prior to the final tightening operation.

Figure 5:
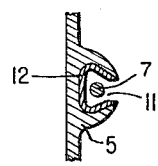
FIGURE 5 is a transverse cross-sectional view, on an enlarged scale, through a modified embodiment of a battery-securing arrangement in accordance with the present invention.

An outwardly open channel 11 of the embodiment of FIGURE 5 also serves for the same purpose. This channel 5 is formed by a supporting profile 12 with a U-shaped cross section of which the leg portions extend toward each other to such an extent that the threaded shafts 7 of the battery-securing means may also enter into the U-shaped channel 11 from the side thereof. The bulged securing ledge portions or moldings 5 may also be provided within the scope of the present invention along the long side of the battery or at oppositely disposed corners. In case of vulcanizing or bonding of the liner members, it is of advantage to roughen the outer surface of the profile members in any known manner, for example, by means of small bosses or ribs provided thereon or to render the outer surface porous in order to assure an intimate fastening connection with the material of the battery housing surrounding the same. Additionally, it is of advantage, for example, with a subsequent insertion of the profiled members to provide at the ends thereof either collar-like disks or directly wider collar portions which distribute the clamping pressure of the threaded connection over a larger surface.

While I have shown and described two embodiments in accordance with the present invention, it is understood that the same is not limited thereto, but is susceptible of numerous changes and modifications within the spirit and scope thereof, and I therefore do not wish to be limited to the details shown and described herein but intend to cover all such changes and modifications as are encompassed by the scope of the appended claims.

I claim:

1. An electrical battery especially for motor vehicles, comprising:
   battery housing means provided with two substantially vertically disposed ledge means at two places of the housing means which are disposed approximately mutually opposite each other, said ledge means being of such cross section to enable insertion of liner means, each of said ledge means having an aperture extending therethrough of a length substantially equal to the height of said battery,
   liner means of material resistant to compression and inserted into said aperture for absorbing the clamping forces,
   and clamping means including securing bolt means extending longitudinally through said liner means.

2. A battery according to claim 1, wherein the ledge means are disposed on diagonally opposite corners of the housing means.

3. An electrical battery, especially for motor vehicles, comprising:
   battery housing means provided with two substantially vertically disposed ledge means at two places of the housing means which are disposed approximately mutually opposite each other, said ledge means having aperture means therethrough with walls of such cross section to enable insertion of liner means, said aperture means being of a length substantially equal to the height of said battery,
   liner means of material resistant to compression and inserted into said aperture means for absorbing the clamping forces,
   and clamping means including securing bolt means extending longitudinally through said aperture means,
   both said liner and aperture means being of fully closed cross section.

4. An electrical battery, especially for motor vehicles, comprising:
   battery housing means provided with two substantially vertically disposed ledge means at two places of the housing means which are disposed approximately mutually opposite each other, said ledge means having aperture means therein having walls of a channel-shaped cross section open toward the outside to enable insertion of liner means, said aperture means being of a length substantially equal to the height of said battery,
   liner means of material resistant to compression and inserted into said aperture means,
   and clamping means including bolt means extending longitudinally through said aperture means, said liner means being of a length such as to absorb the force exerted by said clamping means,
   said clamping means comprising a nut and collar means on said bolt means engaging an end of said liner means and said housing means in a single plane.

5. An electrical battery, especially for motor vehicles, comprising:
   battery housing means provided with two substantially vertically disposed ledge means at two places of the housing means which are disposed approximately mutually opposite each other, said ledge means being provided with aperture means therein having walls of a channel-shaped cross section open toward the outside to enable insertion of liner means, said aperture means being of a length substantially equal to the height of said battery,
   liner means of material resistant to compression and inserted into said aperture means for absorbing the clamping forces,
   and clamping means including bolt means extending longitudinally through said aperture means,
   said liner means including a longitudinally extending acid-resistant channel-like member of approximately U-shaped cross section, said channel like member being of a length sufficient to absorb the forces exerted by said clamping means.

6. An electrical battery, especially for motor vehicles, comprising:
   battery housing means provided with two substantially vertically disposed ledge means at two places of the housing means which are disposed approximately mutually opposite each other, said ledge means being of a channel-shaped cross section open toward the outside to enable insertion of liner means,
   liner means of material resistant to compression and inserted into said ledge means for absorbing the clamping forces,
   and clamping means including bolt means including a bolt extending longitudinally through said ledge means, and nut means on said bolt,
   said liner means including a longitudinally extending acid-resistant channel-like member of approximately U-shaped cross section, said member being of a length substantially equal to the height of said battery,
   the leg portions of the U-shaped cross section of the channel-like member extending toward each other to such an extent that the bolt means may be inserted from the outside transversely through the open channel, said nut means on said bolt comprising a nut member on one end of said bolt and provided with a collar member in plane contact with one end of said channel like member and in plane contact with said battery housing means.

7. An electrical battery, especially for motor vehicles, comprising:
   battery housing means provided with two substantially vertically disposed ledge means at two places of the housing means which are disposed approximately mutually opposite each other, said ledge means being provided with an aperture therethrough comprising walls of a cross section to enable insertion into the ledge means of liner means,
   liner means of material resistant to compression and inserted into said ledge means to absorb the clamping forces,
   and clamping means including bolt means including a bolt extending longitudinally through said liner means for securing the battery in place, said clamping means further including nut and collar means on one end of said bolt, said collar means engaging an end of said liner means and said housing means in a single plane,
   the internal dimensions of said liner means and the external dimensions of said bolt being such that sufficient play remains to permit adjustment of the battery by a slight amount, longitudinally as well as transversely.

8. An electrical battery, especially for motor vehicles, comprising:
   battery housing means provided with two substantially verically disposed ledge means at two places of the housing means which are disposed approximately mutually opposite each other, said ledge means being of a cross section to enable insertion into the ledge means of liner means,
   liner means of material resistant to compression and inserted into said ledge means to absorb the clamping forces,
   and clamping means including bolt means extending longitudinally through said liner means for securing the battery in place,
   and collar-like means near the ends of said liner means to distribute the clamping pressures over large surfaces, said clamping means further including a nut member threaded on said bolt means and engaging one of said collar-like means,
   said one of said collar-like means engaging one end of said liner means and said battery housing means in a single plane.

9. An electrical battery, especially for motor vehicles, comprising:
   battery housing means provided with two substantially vertically disposed ledge means at two places of the housing means which are disposed approximately mutually opposite each other, said ledge means being of a channel-shaped cross section open toward the outside to enable insertion of liner means,
   liner means of material resistant to compression and inserted into said ledge means for absorbing the clamping forces,
   and clamping means including bolt means extending longitudinally through said ledge means,
   said liner means including a longitudinally extending acid-resistant channel-like member of approximately U-shaped cross section,
   the leg portions of the U-shaped cross section of the channel-like member extending toward each other to such an extent that the bolt means may be inserted from the outside transversely through the open channel,
   the internal dimensions of said liner means and the external dimensions of said bolt means being such that sufficient play remains to permit adjustment of the battery by a slight amount in the longitudinal and transverse directions,
   and said liner means being provided with collar-like means near the ends thereof to distribute the clamping pressure over large surfaces, said collar-like means comprising a collar member engaging an end of said channel-like member and said battery housing means in a single plane,
   and said clamping means further comprising a nut member threaded on one end of said bolt means and engaging said collar member.

10. An electrical battery, especially for motor vehicles, comprising:
    battery housing means provided with two substantially vertically disposed ledge means at two places of the housing means which are disposed approximately mutually opposite each other, said ledge means being of a cross section to enable insertion into the ledge means of liner means,
    liner means of material resistant to compression and inserted into said ledge means to absorb the clamping forces,
    and clamping means including bolt means extending longitudinally through said liner means for securing the battery, and nut means for said bolt means,
    the internal dimensions of said liner means and the external dimensions of said bolt means being such that sufficient play remains to permit adjustment of the battery by a slight amount longitudinally as well as transversely,
    and collar-like means near the ends of said liner means to distribute the clamping pressures over large surfaces, said nut means including a nut member in engagement with one of said collar-like means, said one of said collar-like means engaging an end of said liner means and said housing means in a single plane.

References Cited by the Examiner
FOREIGN PATENTS

| | | |
|---|---|---|
| 556,687 | 7/1923 | France. |
| 694,508 | 12/1930 | France. |
| 172,793 | 12/1921 | Great Britain. |

WINSTON A. DOUGLAS, *Primary Examiner.*

JOHN H. MACK, *Examiner.*